United States Patent
Oba et al.

(10) Patent No.: US 10,506,430 B2
(45) Date of Patent: Dec. 10, 2019

(54) COMMUNICATION APPARATUS, COMMUNICATION METHOD, AND COMPUTER PROGRAM PRODUCT

(71) Applicant: KABUSHIKI KAISHA TOSHIBA, Tokyo (JP)

(72) Inventors: Yoshihiro Oba, Kanagawa (JP); Ren Sakata, Kanagawa (JP); Hiroki Kudo, Kanagawa (JP); Yusuke Doi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 12 days.

(21) Appl. No.: 15/069,162

(22) Filed: Mar. 14, 2016

(65) Prior Publication Data
US 2016/0198344 A1 Jul. 7, 2016

Related U.S. Application Data

(63) Continuation of application No. PCT/JP2014/053544, filed on Feb. 14, 2014.

(51) Int. Cl.
*H04W 12/06* (2009.01)
*H04W 12/04* (2009.01)
(Continued)

(52) U.S. Cl.
CPC ........... *H04W 12/06* (2013.01); *H04L 9/0844* (2013.01); *H04W 12/003* (2019.01);
(Continued)

(58) Field of Classification Search
CPC ..... H04W 12/06; H04W 12/04; H04W 12/02; H04W 84/18; H04W 84/12;
(Continued)

(56) References Cited

U.S. PATENT DOCUMENTS 9,420,336 B1 * 8/2016 Woodhead ......... H04N 21/4408
2005/0003856 A1 * 1/2005 Jang .................... H04W 72/121
455/553.1
(Continued)

FOREIGN PATENT DOCUMENTS

CN 103327572 9/2013
JP 2005-176320 6/2005
(Continued)

OTHER PUBLICATIONS

International Search Report from the Japanese Patent Office for International Application No. PCT/JP2014/053544, dated Apr. 8, 2014.
(Continued)

*Primary Examiner* — Dinh Nguyen
(74) *Attorney, Agent, or Firm* — Finnegan, Henderson, Farabow, Garrett & Dunner, L.L.P.

(57) ABSTRACT

According to an embodiment, a communication apparatus includes a receiver, a first beacon processor, a second beacon processor, and an authentication processor. The receiver receives a first beacon transmitted over a wireless network while being protected by a first common key and a second beacon transmitted over the wireless network while not being protected by the first common key. The first beacon processor accesses the wireless network using information contained in the first beacon when the first common key is provided. The second beacon processor accesses the wireless network using information contained in the second beacon when the first common key is not provided. The authentication processor performs connection authentication to the wireless network using information contained in the second beacon and acquires the first common key.

10 Claims, 16 Drawing Sheets

(51) Int. Cl.
*H04W 12/02* (2009.01)
*H04W 84/12* (2009.01)
*H04W 84/18* (2009.01)
*H04L 9/08* (2006.01)
*H04L 29/06* (2006.01)
*H04W 12/00* (2009.01)

(52) U.S. Cl.
CPC ......... *H04W 12/04* (2013.01); *H04L 63/0442* (2013.01); *H04L 2209/80* (2013.01); *H04W 12/02* (2013.01); *H04W 84/12* (2013.01); *H04W 84/18* (2013.01)

(58) Field of Classification Search
CPC ............... H04W 12/003; H04L 9/0844; H04L 63/0442; H04L 2209/80
See application file for complete search history.

(56) References Cited

U.S. PATENT DOCUMENTS

| | | | |
|---|---|---|---|
| 2005/0125693 | A1 | 6/2005 | Duplessis et al. |
| 2005/0177639 | A1* | 8/2005 | Reunamaki ........... H04W 84/18 709/227 |
| 2006/0116170 | A1* | 6/2006 | Brahmbhatt .......... H04W 88/08 455/560 |
| 2006/0268802 | A1* | 11/2006 | Faccin .................... H04L 12/46 370/338 |
| 2007/0190973 | A1 | 8/2007 | Goto et al. |
| 2007/0286109 | A1 | 12/2007 | Kaku et al. |
| 2008/0065884 | A1 | 3/2008 | Emeott et al. |
| 2008/0137599 | A1* | 6/2008 | Ham ..................... H04W 16/10 370/329 |
| 2009/0164785 | A1* | 6/2009 | Metke .................. H04L 9/3273 713/169 |
| 2010/0287288 | A1* | 11/2010 | Driscoll ............. H04L 63/0869 709/229 |
| 2012/0144199 | A1 | 6/2012 | Hamachi |
| 2014/0006787 | A1 | 1/2014 | Measson et al. |
| 2014/0219168 | A1* | 8/2014 | Joo ..................... H04W 40/246 370/328 |

FOREIGN PATENT DOCUMENTS

| | | |
|---|---|---|
| JP | 2006-191452 A | 7/2006 |
| JP | 2006-285826 | 10/2006 |
| JP | 2006-332788 | 12/2006 |
| JP | 2007-295521 | 11/2007 |
| JP | 2010-503330 | 1/2010 |
| JP | 2012-124665 | 6/2012 |

OTHER PUBLICATIONS

Written Opinion of the International Searching Authority from the Japanese Patent Office for International Applicartion No. PCT/JP2014/053544, dated Apr. 8, 2014.

American National Standard, ANSI/ISA-100.11a-2011, "Wireless Systems for Industrial Automation: Process Control and Related Applications", pp. 1-791, (2011).

* cited by examiner

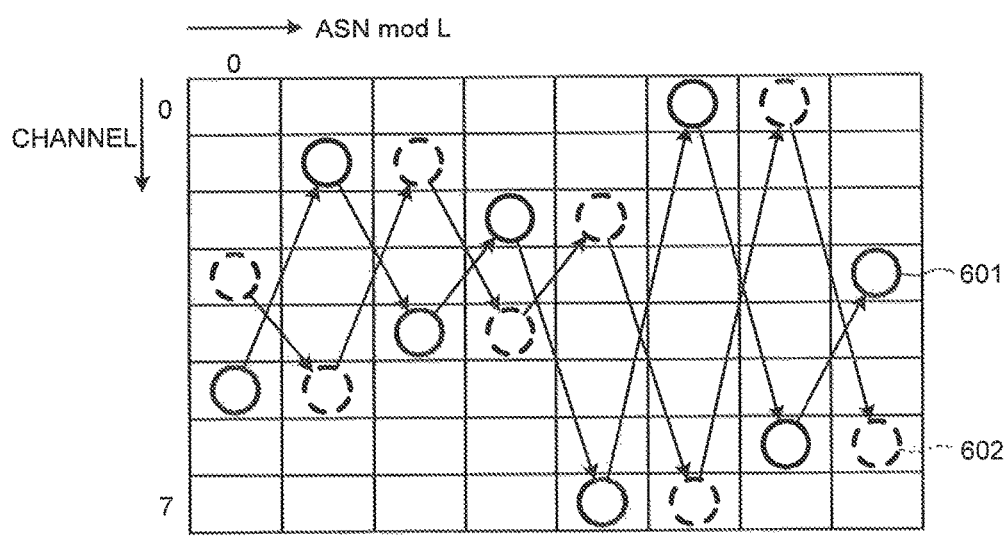

FIG.9

| Security Control | Frame Counter | Key Identifier |
|---|---|---|

FIG.10

| Security Level | Key Identifier Mode | Frame Counter Suppression | Frame Counter Size | Reserved |
|---|---|---|---|---|

FIG.11

| ASN | Join Priority |
|---|---|

FIG. 14

| Hopping Sequence ID | Channel Page | Number of Channels | Phy Configuration | Extended bitmap | Hopping sequence length | Hopping sequence list | Current Hop |

1401

COMMUNICATION APPARATUS, COMMUNICATION METHOD, AND COMPUTER PROGRAM PRODUCT

CROSS-REFERENCE TO RELATED APPLICATIONS

This application is a continuation of PCT international application Ser. No. PCT/JP2014/053544 filed on Feb. 14, 2014 which designates the United States; the entire contents of which are incorporated herein by reference.

FIELD

Embodiments described herein relate generally to a communication apparatus, a communication method, and a computer program product.

BACKGROUND

In IEEE 802.15.4e-2012, a wireless mesh network communication standard using Time-Slotted Channel Hopping (TSCH) Media Access Control (MAC) has been proposed. In this standard, at the time of initial connection of a node to an object network, connection authentication is performed to acquire a MAC layer cryptographic key used in the object network. For the connection authentication, a 128-bit common key unique to the object network called a "join key" is used, and only a node having the join key succeeds in the connection authentication. If a node does not have the join key to the object network, a procedure called "over-the-air (OTA) provisioning" that dynamically distributes the join key is executed on an exclusive network called a provisioning network.

The provisioning network uses the same MAC layer and physical layer as those of the object network, and is generally constructed such that wireless coverage of the provisioning network and wireless coverage of the object network to overlap with each other in order to achieve on-site join key acquisition. For connection authentication to the provisioning network, a 128-bit common key called a default join key or an open join key is used.

The value of the default join key is a fixed value opened in accordance with a standard, and the value of the open join key is a closed fixed value set in a node in advance. When a certain node succeeds in the connection authentication to the provisioning network, the join key to the object network is encrypted with a public key of this node and is distributed. This node decrypts the join key with a secret key corresponding to the public key of the node itself, thereby acquiring the join key.

BRIEF DESCRIPTION OF THE DRAWINGS

FIG. 6 is a diagram of a hopping sequence used in TSCH MAC;

FIG. 7 is a diagram of a slotframe used in TSCH MAC;

FIG. 9 is a diagram of a format of an Auxiliary Security Header field;

FIG. 10 is a diagram of a format of a Security Control field;

FIG. 11 is a diagram of a format of a payload part of "TSCH Synchronization IE";

FIG. 14 is a diagram of a format of a payload part of "Channel Hopping IE";

DETAILED DESCRIPTION

Figure 1:
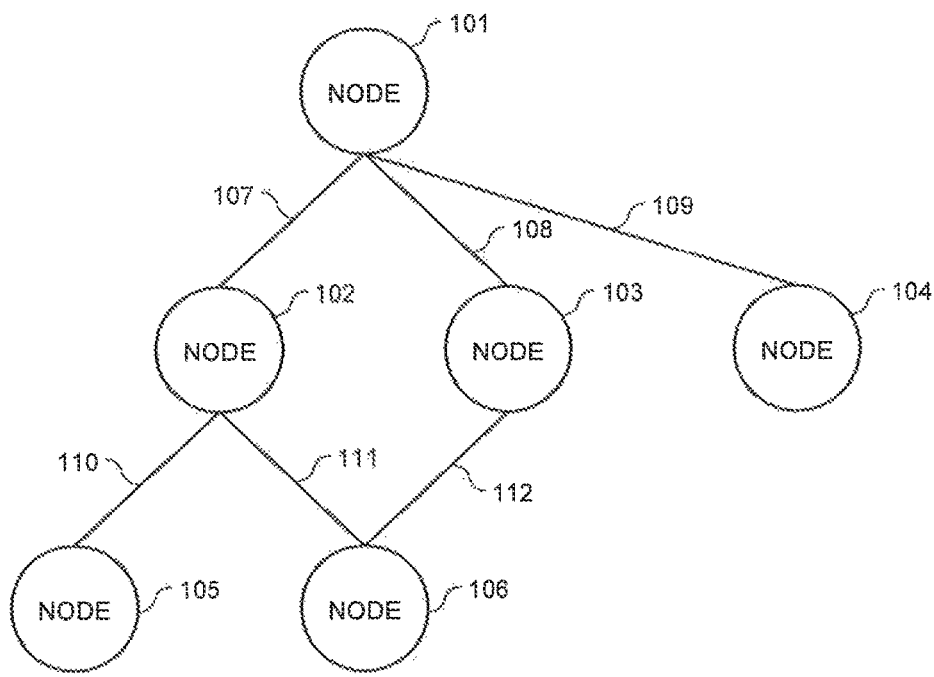
FIG. 1 is a diagram of a configuration example of an object network in a wireless communication system according to a first embodiment.

According to an embodiment, a communication apparatus includes a receiver, a first beacon processor, a second beacon processor, and an authentication processor. The receiver receives a first beacon transmitted over a wireless network while being protected by a first common key and a second beacon transmitted over the wireless network while not being protected by the first common key. The first beacon processor accesses the wireless network using information contained in the first beacon when the first common key is provided. The second beacon processor accesses the wireless network using information contained in the second beacon when the first common key is not provided. The authentication processor performs connection authentication to the wireless network using information contained in the second beacon and acquires the first common key.

Embodiments will be described in detail with reference to the attached drawings.

First Embodiment

A wireless communication system according to a first embodiment uses both two kinds of beacons (a first beacon and a second beacon) protected with different security levels or different pieces of key information for a node (communication apparatus) already connected to an object wireless network (an object network) and a node unconnected thereto. With this configuration, connection authentication for the unconnected node can be performed while providing the safety of communication for the already-connected node without requiring a provisioning network.

The protection is processing containing at least one of encryption using a cryptographic key and addition of message authentication information, for example. The cancellation of the protection is processing containing at least one of decryption of an encrypted message and verification of the message authentication information, for example. The following mainly describes a case in which the encryption is used as the protection as an example. The message authentication information may be a message authentication code calculated using common key cryptography or may be a digital signature calculated using public key cryptography.

The second beacon is not necessarily encrypted. The second beacon may be encrypted with a cryptographic key (a second common key) different from a cryptographic key used for the encryption of the first beacon. The second cryptographic key may be a common key, a reliable public key, or a secret key corresponding to a public key with a digital signature of a reliable certification authority affixed.

The object network may be a wireless network using IEEE 802.15.4e-2012 TSCH MAC and may use a link that is a Shared Tx link and an Rx link for connection authentication.

The applicable network is not limited to the above example. For example, it is applicable to a network with a wireless LAN standard such as Wireless Fidelity (Wi-Fi). The link for use in the connection authentication is not limited to the above example and may be any link so long as it can be used by an unauthenticated node. The communication apparatus (node) may be any apparatus so long as it enables wireless communication. The communication apparatus may be implemented as a smart meter, a sensor, or a home appliance having wireless communication functionality, for example.

The first beacon and the second beacon may be periodically transmitted with a certain mixed ratio maintained (a periodic beacon). In this situation, the mixed ratio between the first beacon and the second beacon may be changed dynamically in accordance with the number of connected nodes. The second beacon may be transmitted as a response upon reception of a beacon transmission request (an on-demand beacon). The periodic beacon and the on-demand beacon can coexist.

The second beacon does not necessarily contain information required only for the node connected to the object network.

FIG. 1 is a diagram of a configuration example of the object network in the wireless communication system according to the first embodiment. As illustrated in FIG. 1, in the wireless communication system according to the present embodiment, nodes 101 to 106 as communication apparatuses are connected with each other with links 107 to 112 as bidirectional wireless links between two nodes.

The node 101 and the node 102 are connected with each other with the link 107. The node 101 and the node 103 are connected with each other with the link 108. The node 101 and the node 104 are connected with each other with the link 109. The node 102 and the node 105 are connected with each other with the link 110. The node 102 and the node 106 are connected with each other with the link 111. The node 103 and the node 106 are connected with each other with the link 112.

The node 101 is assumed to be a coordinator of the object network, for example. The beacons (the first beacon and the second beacon) can be transmitted from each of these nodes. The nodes can have a similar configuration. The following may refer to the nodes 101 to 106 as a node 100 if they do not need to be distinguished from each other.

Figure 2:
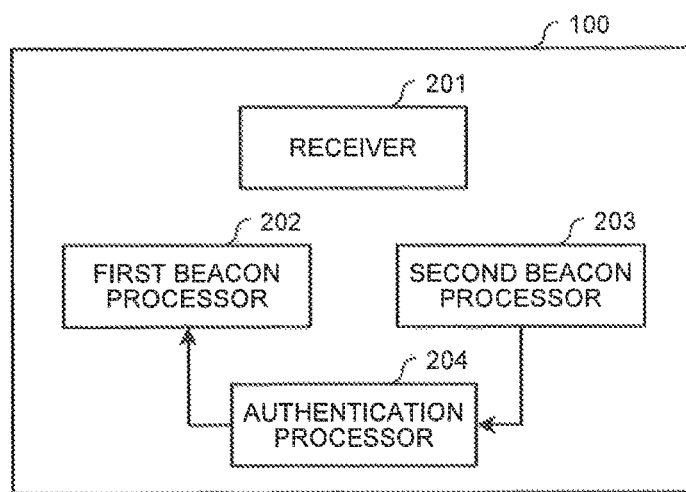
FIG. 2 is a diagram of a configuration example of a node according to the first embodiment.

FIG. 2 is a diagram of a configuration example of the node 100 according to the first embodiment. As illustrated in FIG. 2, the node 100 includes a receiver 201, a first beacon processor 202, a second beacon processor 203, and an authentication processor 204.

The receiver 201 receives various kinds of information from an external apparatus such as another node. The receiver 201 receives the beacons transmitted over the object network, for example. In the present embodiment, the first beacon and the second beacon are transmitted over the object network. The first beacon is a beacon transmitted over the object network while being encrypted with a cryptographic key for the first beacon (a first common key). The second beacon is a beacon transmitted over the object network while not being encrypted with the cryptographic key for the first beacon.

The first beacon processor 202 accesses the object network using information contained in the first beacon when the cryptographic key for the first beacon has already been obtained. The second beacon processor 203 accesses the object network using information contained in the second beacon when the cryptographic key for the first beacon has not been obtained.

The authentication processor 204 performs connection authentication to the object network using information contained in the second beacon and acquires the cryptographic key for the first beacon. The authentication processor 204 receives MAC control information required for accessing the object network (hereinafter, referred to as MAC control information) from the second beacon processor 203 and outputs the cryptographic key for the first beacon to the first beacon processor 202 when succeeding in the connection authentication, for example. The output cryptographic key for the first beacon may be stored in a storage (not illustrated) such as a random access memory (RAM).

Although any authentication protocol can be used by the authentication processor 204, Protocol for carrying Authentication for Network Access (PANA) prescribed in RFC 5191, IEEE 802.1X, and HIP-DEX or the like can be used as a connection authentication protocol, for example.

The first beacon processor 202 decrypts the first beacon encrypted using the cryptographic key for the first beacon input from the authentication processor 204.

When the node 100 is a relay node, the first beacon processor 202 and the second beacon processor 203 may have functionality (transmitters) to transmit the first beacon and the second beacon, respectively. Although FIG. 2 illustrates the components used mainly for the processing of the MAC control information, the node 100 may include any component that executes any functionality other than this.

The units (the receiver, the first beacon processor, the second beacon processor, the authentication processor, and the like) of the node 100 may be implemented by causing a processor such as a central processor (CPU) to execute a computer program, that is, by software, implemented by hardware such as an integrated circuit (IC), or implemented by both using software and hardware, for example.

Figure 3:
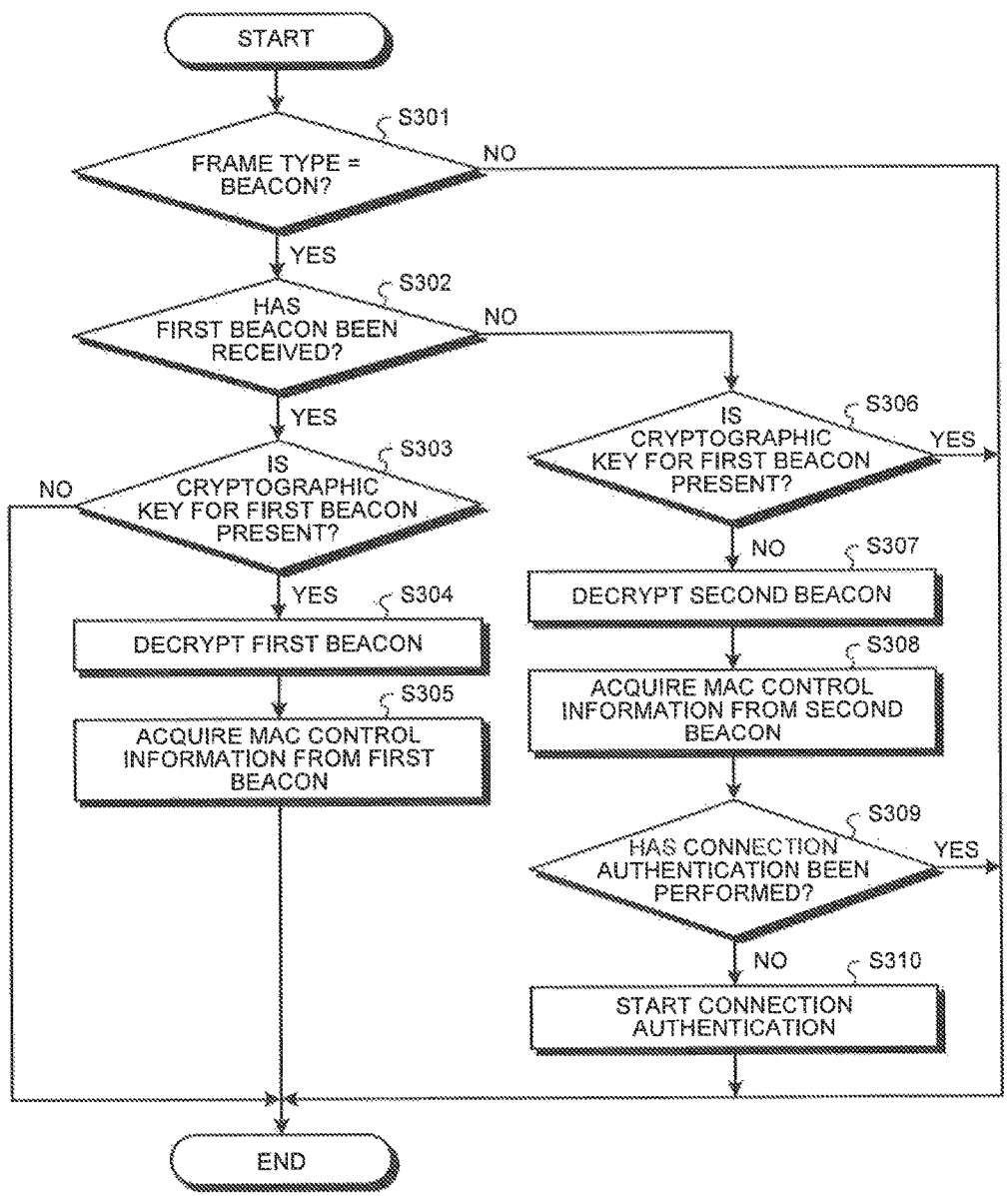
FIG. 3 is a flowchart of communication control processing in the first embodiment.

Next, the following describes communication control processing by the thus configured node 100 according to the first embodiment with reference to FIG. 3. FIG. 3 is a flowchart of the entire procedure of the communication control processing in the first embodiment.

FIG. 3 illustrates an example of a case in which both the first beacon and the second beacon are encrypted. FIG. 3 is processing performed when a MAC frame is received, for example.

Upon reception of the MAC frame, the receiver 201 determines whether a frame type of the received MAC frame is a beacon (Step S301). If the frame type is not the beacon (No at Step S301), the processing ends. Although omitted in FIG. 3, for a frame type other than the beacon (an association request, an association response, an ACK, or a beacon request, for example), processing appropriate for each of the frame types is executed.

If the frame type is the beacon (Yes at Step S301), the receiver 201 determines whether the first beacon has been received (Step S302). Whether the frame type is the first beacon can be determined by frame control information (details of which will be described below) such as Security Enabled, for example.

If the first beacon has been received (Yes at Step S302), the first beacon processor 202 determines whether the cryptographic key for the first beacon is present (Step S303). The first beacon processor 202 determines that the cryptographic key for the first beacon is present when the connection authentication has already been performed and the cryptographic key for the first beacon is stored in the storage or the like, for example.

If the cryptographic key for the first beacon is present (Yes at Step S303), the first beacon processor 202 decrypts the first beacon (Step 3304). The first beacon processor 202 acquires the MAC control information from the decrypted first beacon (Step S305) and ends the processing. If the cryptographic key for the first beacon is absent (No at Step S303), the first beacon processor 202 ends the processing.

If the first beacon has not been received, that is, if the second beacon has been received (No at Step 3302), the second beacon processor 203 determines whether the cryptographic key for the first beacon is present (Step S306). If the cryptographic key for the first beacon is not provided (No at Step S306), the second beacon processor 203 decrypts the second beacon (Step 307). If the second beacon is not encrypted, Step S307 is omitted. The second beacon processor 203 acquires the MAC control information from the decrypted second beacon (Step S308).

If the cryptographic key for the first beacon is provided (Yes at Step S306), the second beacon processor 203 ends the processing. This is because if the cryptographic key for the first beacon has already been provided, there is no need to execute the connection authentication.

The authentication processor 204 determines whether the connection authentication has been performed between the node 100 and a node as a beacon transmission source (Step S309). If the connection authentication has been performed (Yes at Step S309), the authentication processor 204 ends the processing. If the connection authentication has not been performed (No at Step S309), the authentication processor 204 starts the connection authentication between it and the node as the beacon transmission source (Step S310).

Figure 4:
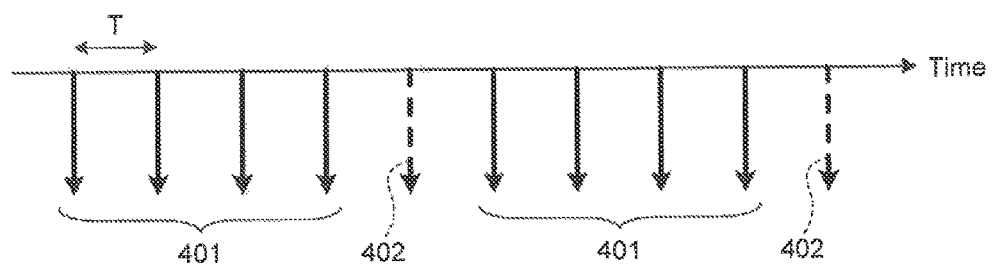
FIG. 4 is a diagram of transmission timing of a second beacon according to the first embodiment.
Figure 5:
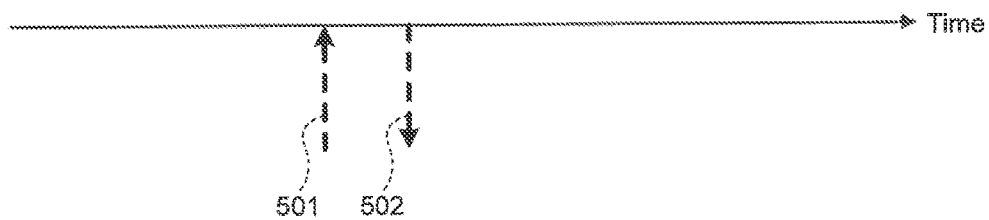
FIG. 5 is a diagram of the transmission timing of the second beacon according to the first embodiment.

FIG. 4 and FIG. 5 are diagrams of transmission timing of the second beacon received by the node 100 according to the first embodiment. FIG. 4 is an example when the beacons are periodically transmitted. FIG. 5 is an example when the second beacon is transmitted as the on-demand beacon.

Beacons 401 and 402 in FIG. 4 indicate the first beacon and the second beacon, respectively. Either the beacon 401 or the beacon 402 is transmitted at constant time intervals T. In FIG. 4, the beacon 401 and the beacon 402 are transmitted so that the mixed ratio between the beacon 401 and the beacon 402 will be 4:1.

The mixed ratio between the first beacon and the second beacon may be changed dynamically in accordance with the number of the connected nodes, for example. The mixed ratio between the first beacon and the second beacon may be set so as to transmit the second beacon alone if the number of the connected nodes is zero, to transmit the first beacon alone if the number of the connected nodes reaches a maximum connectable number, and to be proportional to the number of the connected nodes otherwise, for example.

Beacons 501 and 502 in FIG. 5 indicate a second beacon transmission request and the second beacon transmitted in response to the second beacon transmission request, respectively. The node 100 transmits the beacon 501 in a broadcast manner and receives the beacon 502 as a response thereof, for example.

The following describes a configuration example when the object network is a wireless mesh network using IEEE 802.15.4e-2012 TSCH MAC.

In TSCH MAC, a time axis is divided into timeslots with a constant length. In each of the timeslots, a maximum of one MAC frame (except an ACK frame) is transmitted, and a maximum of one ACK frame is then transmitted from a node that has received this frame as a receipt confirmation.

Each of the timeslots is identified by a 5-octet nonnegative integer called an absolute slot number (ASN) that is created by a coordinator and is propagated through the object network. The ASN is broadcast using an enhanced beacon (EB). The EB is transmitted in a unicast manner as a response to an enhanced beacon request (EBR).

In the present embodiment, the EB is used as the first beacon and the second beacon. In a certain timeslot, a channel CH for use in the transmission or reception of the MAC frame is defined as the following equation (1) by an array called a hopping sequence list (HSL) with channel numbers as array elements, the ASN of the timeslot, and a channel offset (CO), with L as the number of the array elements of the HSL:

$$CH=HSL[(ASN+CO) \bmod L] \qquad (1)$$

A timeslot to which a channel used for communication with a communication node as an EB transmission source is allocated is called a link. The type of the link includes a transmission link (a Tx link), a shared transmission link (a Shared Tx link), and a reception link (an Rx link).

In the present embodiment, the Tx link is assumed to be a link that only a specific node 100 can use for transmission. The Shared Tx link is assumed to be a link that multiple nodes 100 can use for transmission. The Rx link is assumed to be a link that the multiple nodes 100 can use for transmission and reception when combined with the Shared Tx and that a specific node or multiple nodes 100 can use for reception when used singly. The EB is transmitted on the Rx link. In the present embodiment, the connection authentication is performed using a link that is the Shared Tx link and the Rx link.

In the same timeslot, different COs are used, whereby a plurality of links having different channels can be present.

In FIG. 6, the horizontal axis indicates "ASN mod L," whereas the vertical axis indicates a channel. An origin is on the left end of the horizontal axis and the upper end of the vertical axis. A pattern 601 indicates a channel hopping pattern when CO=1. A pattern 602 indicates a channel hopping pattern when CO=0. The pattern 602 is given by HSL [0]=3, HSL [1]=5, HSL (2)=1, HSL [3]=4, HSL [4]=2, HSL [5]=7, HSL [6]=0, and HSL [7]=6, for example.

FIG. 7 is s schematic diagram of an example of a slotframe used in IEEE 802.15.4e-2012 TSCH MAC. The slotframe is an array of a certain number of timeslots. The number of timeslots within the slotframe is called a slotframe size. The slotframe size can be set independent of the number of array elements L of the hopping sequence list. The slotframe is repeated with ASN=0 as a starting point and can dynamically be generated, deleted, and changed.

FIG. 7 is an arrangement of a slotframe with a slotframe size of 3 on the time axis. The ith (0≤i<slotframe size) timeslot within the slotframe is defined as TSi. In FIG. 7, TS0 is a timeslot of the Tx link, TS1 is a timesslot of the Rx link, and TS2 is a timeslot with no link allocated.

A plurality of slotframes with different slotframe sizes can coexist in one object network. Each of the slotframes is identified by a nonnegative integer called a slotframe handle. The node 100 can use the slotframes simultaneously. Note that, in each of the timeslots, a slotframe having the Tx link is preferentially used over a slotframe having the Rx link, and a slotframe having a larger slot frame handle is preferentially used.

Figure 8:
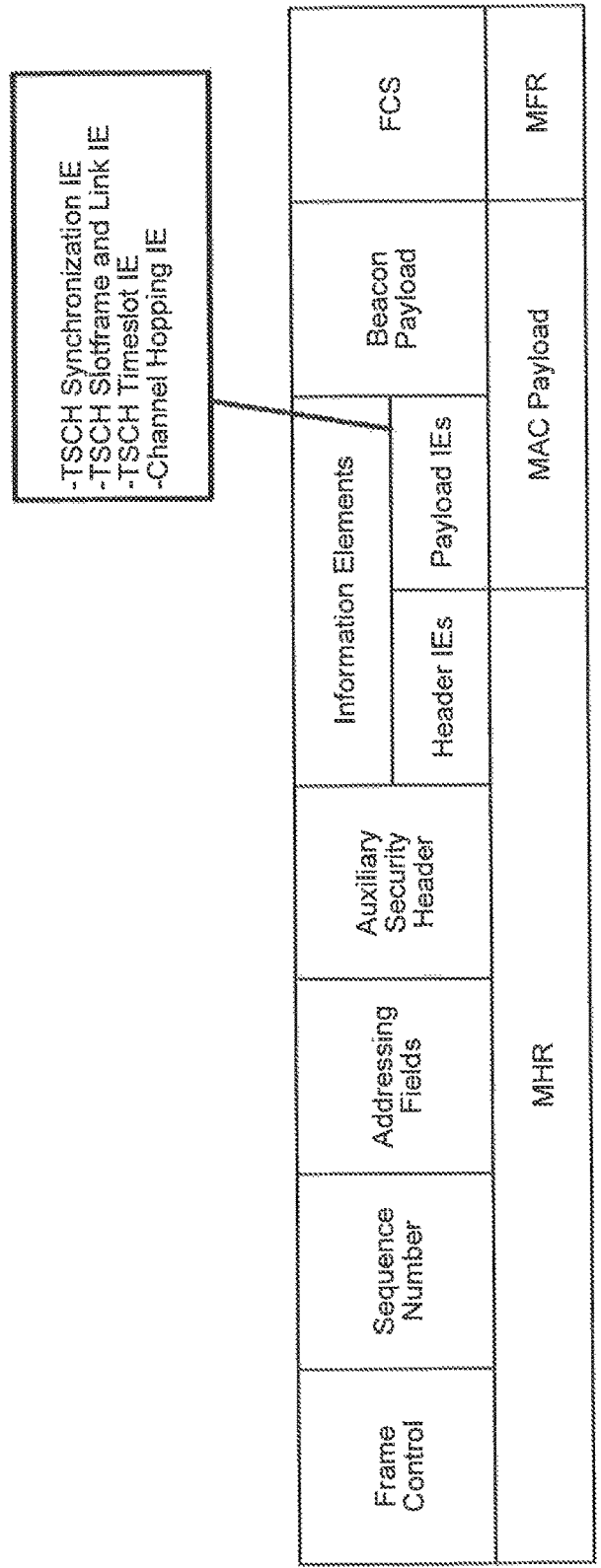
FIG. 8 is a diagram of an example of a format of an EB.

FIG. 8 is a diagram of an example of a format of the EB serving as the first beacon and the second beacon in the present embodiment. The EB contains a MAC header (MFR), a MAC payload (MAC Payload), and a MAC footer (MFR).

The MAC header contains "Frame Control," "Sequence Number," "Addressing Fields," "Auxiliary Security Header," and zero or more "Header IEs (Information Elements)." The MAC footer contains an error detection code (FCS (Frame Check Sequence)). The MAC payload contains zero or more "Payload IEs" and "Beacon Payload."

A Frame Control field contains the frame control information such as Frame Type and Security Enabled. A Security Number field contains a sequence number of the EB. Addressing Fields contains a transmission source personal area network (PAN) identifier, a destination PAN identifier, a transmission source address, and a destination address.

FIG. 9 is a diagram of an example of a format of an Auxiliary Security Header field prescribed in IEEE 802.15.4e-2012. The Auxiliary Security Header field contains a Security Control field, Frame Counter, and Key Identifier.

If the EB is not encrypted, Security Enabled is set to 0, and the Auxiliary Security Header field may be omitted. If the EB is encrypted, the Auxiliary Security Header field is added, and encryption is performed in the MAC payload part using the CCM* algorithm prescribed in IEEE 802.15.4-2011.

In the present embodiment, the Auxiliary Security Header field is used for the first beacon, and if the second beacon is not encrypted, the Auxiliary Security Header field of the second beacon is omitted, for example. If the second beacon is encrypted, the Auxiliary Security Header field is used also for the second beacon, and Key Identifier of the second beacon has a value different from that of Key Identifier of the first beacon. In this case, different cryptographic keys are used for the encryption of the first beacon and the second beacon.

FIG. 10 is a diagram of an example of a format of a Security Control field prescribed in IEEE 802.15.4e-2012. The Security Control field contains Security Level, Key Identifier Mode, Frame Counter Suppression, Frame Counter Size, and an unused part (Reserved). If the EB is encrypted, a non-zero value is set for Security Level. Key Identifier Mode may use any number defined in IEEE 802.15.4-2011. Frame Counter Suppression is set to a value of 1 in TSCH MAC. In this situation, a frame counter in the Auxiliary Security Header field is omitted, and the ASN is used as the frame counter instead. The frame counter size is set to a value of 1 meaning 5 octets in TSCH MAC.

Header IE and Payload IE in FIG. 8 contain other pieces of MAC control information. Beacon Payload contains additional data.

In TSCH MAC, among Payload IEs, "TSCH Synchronization IE," "TSCH Slotframe and Link IE," "TSCH Timeslot IE," and "Channel Hopping IE" of the MLME group are used. The node 100 performs synchronization with respect to the timeslot and channel on the object network using these Information Elements (IEs). Concerning "TSCH Synchronization IE," "TSCH Slotframe and Link IE," and "Channel Hopping IE" among these IEs, ones having different contents among the respective nodes 100 may be transmitted.

Figure 11:
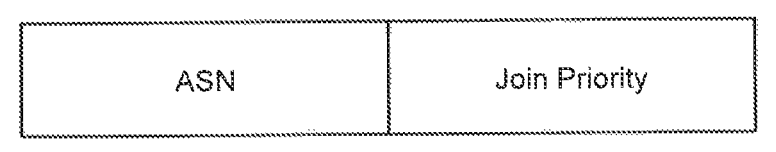

FIG. 11 is a diagram of an example of a format of a payload part of "TSCH Synchronization IE" defined in IEEE 802.15.4e-2012. The "TSCH Synchronization IE" payload contains the ASN and "Join Priority."

Figure 12:
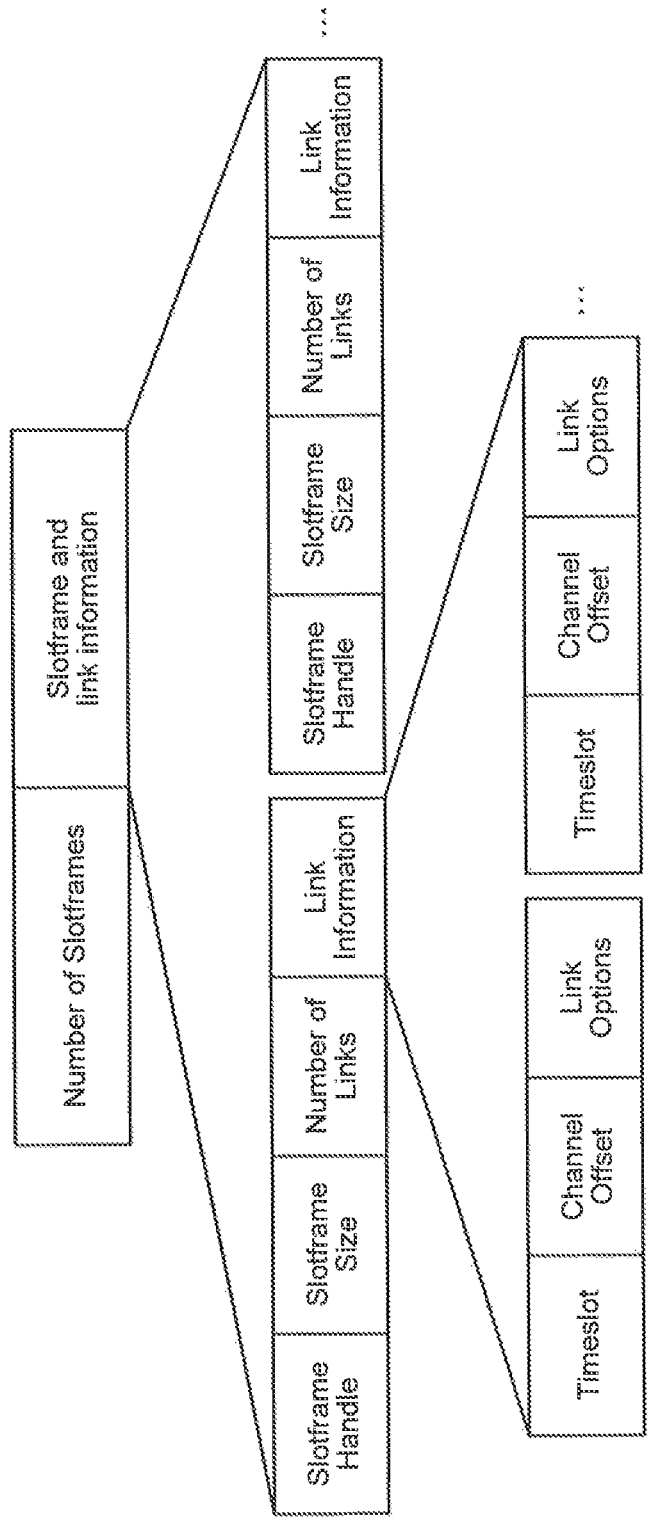
FIG. 12 is a diagram of a format of a payload part of "TSCH Slotframe and Link IE"

FIG. 12 is a diagram of an example of a format of a payload part of "TSCH Slotframe and Link IE" defined in IEEE 802.15.4e-2012. The "TSCH Slotframe and Link IE" payload contains Number of Slotframes and "Slotframe and link information." "Slotframe and link information" contains Slotframe Handle, Slotframe Size, Number of Links, and Link Information for each of the slotframes. Link Information contains Timeslot, Channel Offset, and Link Options. Link Options contains information such as the type of the link.

Figure 13:
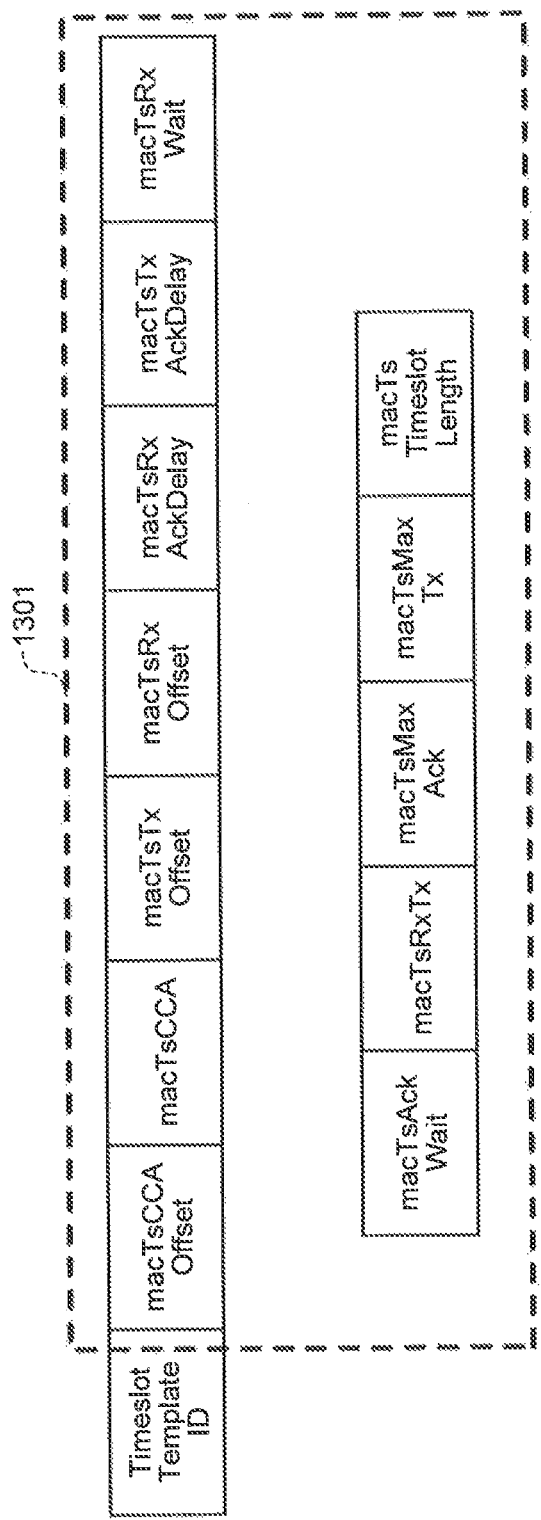
FIG. 13 is a diagram of a format of a payload part of "TSCH Timeslot IE"

FIG. 13 is a diagram of an example of a format of a payload part of "TSCH Timeslot IE" defined in IEEE 802.15.4e-2012. The "TSCH Timeslot IE" payload includes Timeslot Template ID and a frame transmission/reception control parameter set 1301. The frame transmission/reception control parameter set 1301 includes a plurality of frame transmission/reception control parameters as illustrated in FIG. 13. The frame transmission/reception control parameter set 1301 can be omitted. If omitted, the frame transmission/reception control parameter set is set in an out-of-band manner.

FIG. 14 is a diagram of an example of a format of a payload part of "Channel Hopping IE" defined in IEEE 802.15.4e-2012. The "Channel Hopping IE" payload contains Hopping Sequence ID and a channel hopping parameter set 1401. The channel hopping parameter set 1401 contains information such as Number of Channels and Hopping sequence list. The channel hopping parameter set 1401 can be omitted. If omitted, the channel hopping parameter set 1401 is set in an out-of-band manner.

Figure 15:
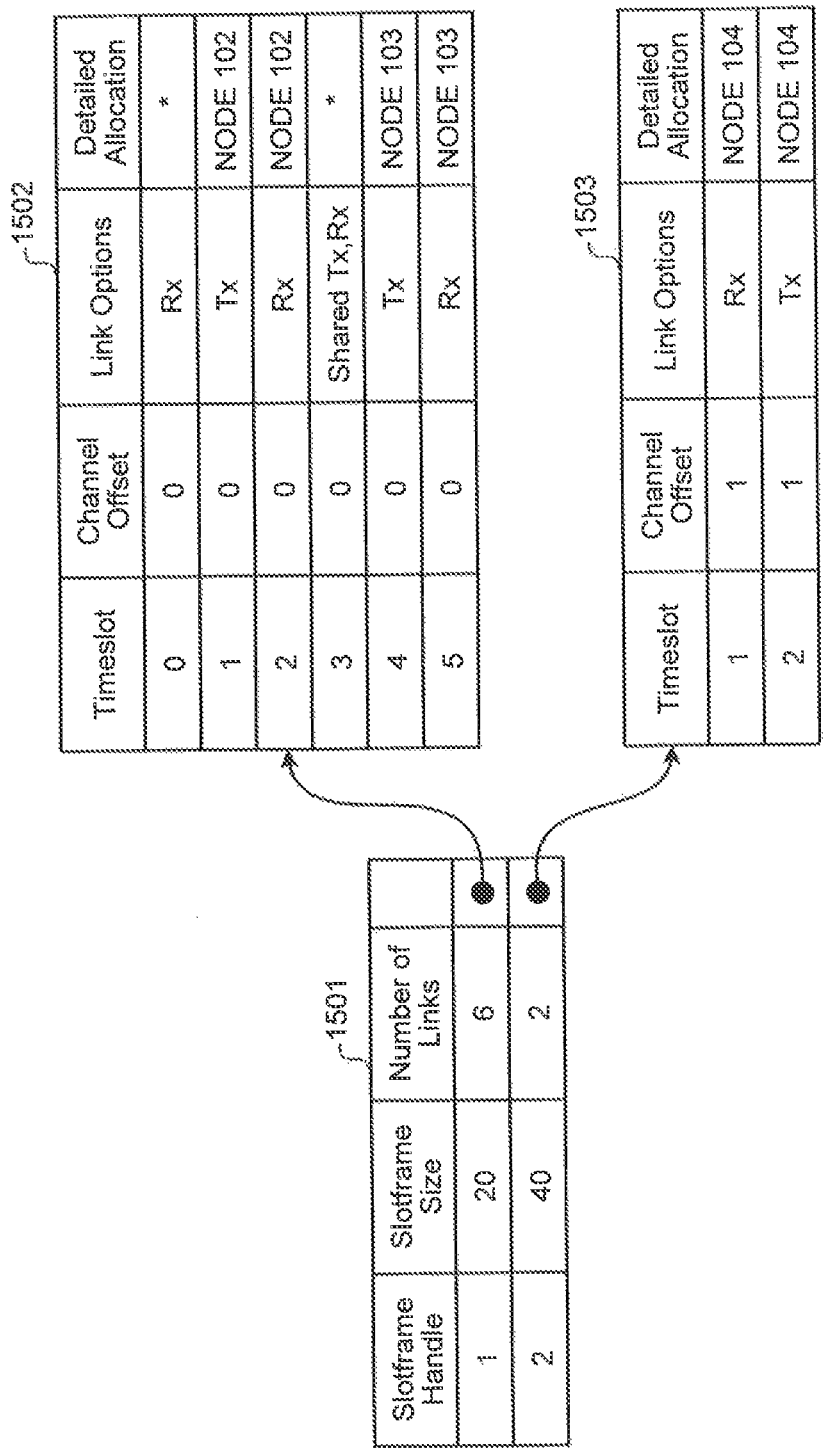
FIG. 15 is a diagram of an operation example when both a first beacon and the second beacon distribute the same TSCH MAC control information.

FIG. 15 is a diagram of an operation example when both the first beacon and the second beacon use the EB, and both the first beacon and the second beacon distribute the same TSCH MAC control information. FIG. 15 is a diagram schematically illustrating the MAC control information transmitted by the EB. The node 100 that has received the EB may store therein the MAC control information in a table format as illustrated in FIG. 15. FIG. 15 illustrates a case in which the EB is transmitted from the node 101 in FIG. 1. A table 1501 is a slotframe table, and a table 1502 and a table 1503 are link tables.

In the table 1501, two slotframes with a slotframe handle value of 1 and 2 are present. The slotframe size of the slotframe with the slotframe handle value 1 is 20, and the number of links thereof is 6. The slotframe size of the slotframe with the slotframe handle value 2 is 40, and the number of links thereof is 2. The slotframe with the slotframe handle value 2 is higher in priority than the slotframe with the slotframe handle value 1.

The table 1502 is a link table for the slotframe with the slotframe handle value 1. The table 1503 is a link table for the slotframe with the slotframe handle value 2. The left three columns of the table 1502 and the table 1503 correspond to Link Information of "TSCH Slotframe and Link IE" (FIG. 12). "Detailed Allocation" on the rightmost column indicates the node 100 to which a link is allocated for communication with the EB transmission source (the node 101 in this example).

A timeslot value of 1 of the table 1502 is allocated to the node 102 for frame reception from the node 101, for example. A timeslot value of 2 is allocated to the node 102 for frame transmission to the node 101. A value "*" of "Detailed Allocation" indicates that any node can be used. A timeslot value of 0 of the table 1502 can be used by any node 100 for frame reception from the node 101, for example. In the present embodiment, an EB frame is assumed to be transmitted on the link that is the Rx link and "Detailed Allocation" of which is "*" (that is, the link with the timeslot value 0 of the table 1502).

Information of "Detailed Allocation" is assumed not to be distributed by the EE and to be set in advance or set in an out-of-band manner by means of an upper layer protocol or the like.

In FIG. 15, the node 102 and the node 103 are allocated with one transmission slot and one reception slot in 20 timeslots in the slotframe with the slotframe handle value 1. The node 104 is allocated with one transmission slot and one reception slot in 40 timeslots in the slotframe with the slotframe handle value 2. Note that, owing to inter-slotframe priority, a slot for transmission and a slot for reception of the node 102 are used for a slot for transmission and a slot for reception, respectively, of the node 104 once in two times. Consequently, a transmission timeslot of the node 102 is ASN mod 40=21, and a reception timeslot of the node 102 is ASN mod 40=22. A transmission timeslot of the node 103 is ASN mod 20=4, and a reception timeslot of the node 103 is ASN mode 20=5. A transmission timeslot of the node 104 is ASN mod 40=1, and a reception timeslot of the node 104 is ASN mod 40=2.

Any node 100 unconnected to the node 101 can obtain the TSCH MAC control information except "Detailed Allocation" from the second beacon. Consequently, the authentication processor 204 of the node 100 uses a timeslot with a timeslot value of 3 of a slotframe with the slotframe handle value 1 the value of "Link Options" of which is Shared Tx and Rx (ASN mod 20=3) for the connection authentication.

As described above, in the first embodiment, the node already connected to the object network acquires the MAC control information by the first beacon encrypted with the cryptographic key effective only for the object network, whereas the node unconnected to the object network acquires the MAC control information by the second beacon. Consequently, the connection authentication for the unconnected node can be performed without requiring the provisioning network while providing the safety of communication for the already-connected node on the object network.

Modification 1

Figure 16:
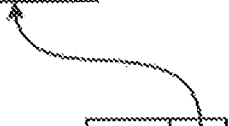
FIG. 16 is a diagram of an operation example when the second beacon does not contain information required only for a connected node.

FIG. 16 is a diagram of an operation example when both the first beacon and the second beacon are the EB and the second beacon does not contain information required only for the node already connected to the object network. FIG. 16 is a diagram schematically illustrating the MAC control information transmitted by the second beacon of Modification 1. The first beacon contains the same information as that in FIG. 15 of the first embodiment.

The EB for the second beacon contains only information about the timeslot value 3 of the slotframe with the slotframe handle value 1 the value of "Link Options" of which is Shared Tx and Rx among the pieces of information contained in the first beacon. The EB for the second beacon does not contain information about timeslot values 1, 2, 4, and 5 of the slotframe with the slotframe handle value 1 and slotframe information on the slotframe handle value 2. In place of not containing unnecessary information, information in which the unnecessary information is replaced with an invalid value may be contained.

Any node 100 unconnected to the node 101 can use the timeslot with the timeslot value 3 of the slotframe with the slotframe handle value 1 the value of "Link Options" of which is Shared Tx and Rx (ASN mod 20=3) for the connection authentication similarly to the case in FIG. 15 of the first embodiment.

As described above, in Modification 1, the node unconnected to the object network cannot identify the link used only by the node already connected to the object network only from the information contained in the second beacon. Consequently, in addition to an effect similar to that of the first embodiment, resistance to a Denial-of-Service (DOS) attack can be improved.

Modification 2

Figure 17:
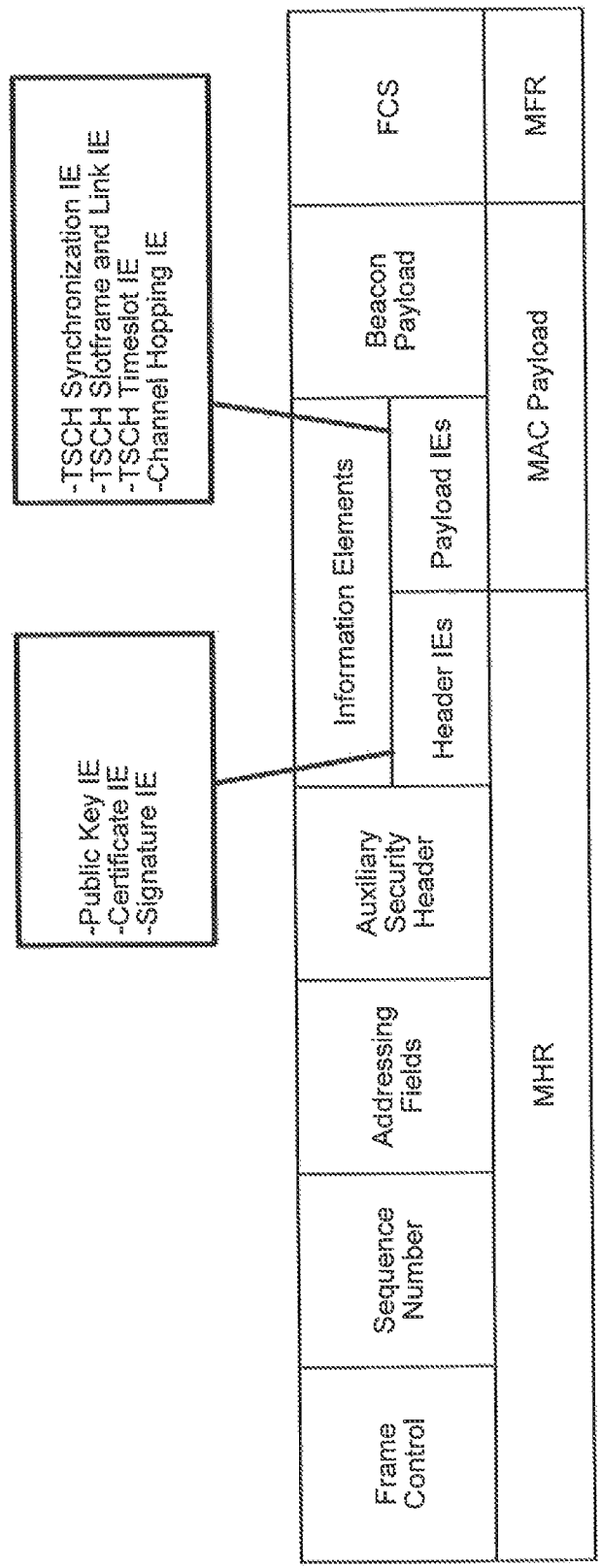
FIG. 17 is a diagram of a configuration example in which the second beacon is encrypted with a public key or a secret key.

FIG. 17 is a diagram of a configuration example when the second beacon is encrypted with a reliable public key or a secret key corresponding to a public key with a digital signature of a reliable certification authority affixed. The first beacon is assumed to be encrypted with a common key similarly to the first embodiment and Modification 1.

In the present modification, the EB is used as the second beacon. The EB of the present modification contains "Public Key IE," "Certificate IE," and "Signature IE" in the part of "Header IE" not encrypted with CCM* as illustrated in FIG. 17.

"Public Key IE" contains a public key of the node 100 that has transmitted the EB (an EB transmission node) "Certificate IE" contains a certificate of the EB transmission node (including the public key of the EB transmission node) issued by the reliable certification authority. "Signature IE" contains a value of a digital signature affixed using a secret key of the EB transmission node to the MAC payload.

When "Public Key IE" is contained, "Certificate IE" is unnecessary. When the public key of the EB transmission node is distributed in an out-of-band manner, both "Public Key IE" and "Certificate IE" are unnecessary. The MAC payload may be encrypted using a secret key corresponding to the public key of the EB transmission node.

As described above, the present modification can also encrypt the second beacon without using a preset group common key such as a default join key or an open join key. Consequently, influence when a communication node is cracked can be prevented from extending through the entire object network. With this effect, in addition to an effect similar to that of the embodiment, the safety of the object network can be improved.

Second Embodiment

In a second embodiment, a beacon having a secure part encrypted with a common key (secure information) and a non-secure part as plaintext (non-secure information) is used.

Figure 18:
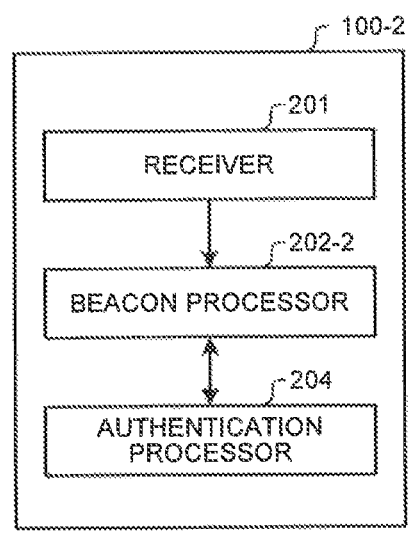
FIG. 18 is a diagram of a configuration example of a node according to a second embodiment.

FIG. 18 is a diagram of a configuration example of a node 100-2 according to the second embodiment. As illustrated in FIG. 18, the node 100-2 includes the receiver 201, a beacon processor 202-2, and the authentication processor 204.

The second embodiment is different from the first embodiment in that the beacon processor 202-2 is included in place of the first beacon processor 202 and the second beacon processor 203. The other components and functionality are similar to FIG. 2 as the block diagram of the node 100 according to the first embodiment and are attached with the same symbols, and descriptions thereof will be omitted.

The beacon processor 202-2 accesses the object network using information contained in the beacon if a cryptographic key (a common key) for the secure part has been obtained. The beacon processor 202-2 accesses the object network using information contained in the non-secure part if the cryptographic key for the secure part has not been obtained. The beacon processor 202-2 thus executes the processing using the secure part and the processing using the non-secure part in place of the processing using the first beacon by the first beacon processor 202 and the processing using the second beacon by the second beacon processor 203, respectively.

When the cryptographic key for the secure part is obtained by authentication processing, the beacon processor 202-2 decrypts the encrypted secure part using this cryptographic key.

Figure 19:
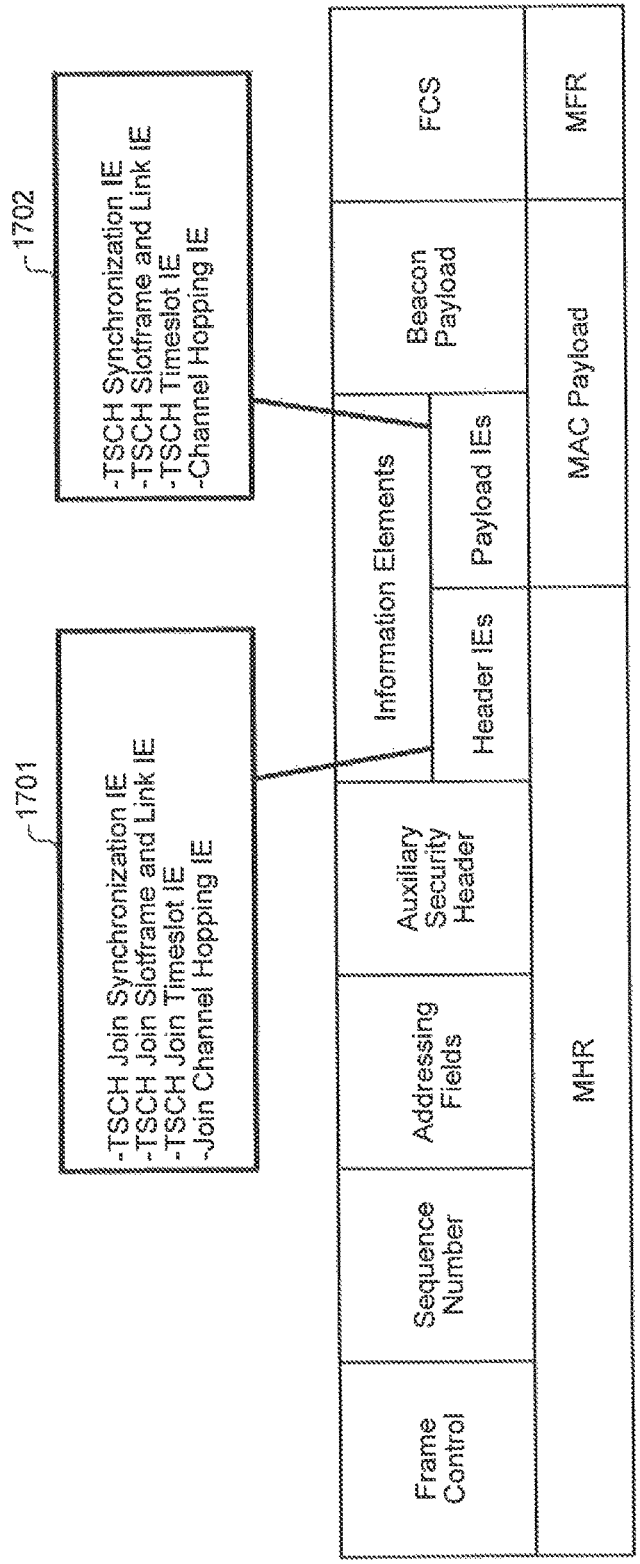
FIG. 19 is a diagram of a format of a beacon used in the second embodiment.

FIG. 19 is a diagram of an example of a format of the beacon used in the second embodiment. In the second embodiment, the EB is used as the beacon. Note that, in a part 1701 of "Header IE" as the unencrypted non-secure part, "TSCH Join Synchronization IE," "TSCH Join Slotframe and Link IE," "TSCH Join Timeslot IE," and "Join Channel Hopping IE" having the same IE payload structures as "TSCH Synchronization IE," "TSCH Slotframe and Link IE," "TSCH Timeslot IE," and "Channel Hopping IE," respectively, of IEEE 802.15.4e-2012 are used. "TSCH Synchronization IE," "TSCH Slotframe and Link IE," "TSCH Timeslot IE," and "Channel Hopping IE" are contained in a part 1702 of "Payload IE" and are encrypted.

The beacon of the present embodiment may periodically be transmitted similarly to FIG. 4 or transmitted as an on-demand beacon similarly to FIG. 5.

The node 100-2 that can access the object network accesses the object network using information contained in the secure part of the beacon if the cryptographic key for the secure part is provided. If the cryptographic key for the secure part is not provided, the node 100-2 accesses the object network and performs connection authentication thereto using the non-secure part of the beacon and acquires the cryptographic key for the secure part when succeeding in the connection authentication. Similarly, to Modification 1, the non-secure part does not necessarily contain information required only for the node 100-2 connected to the object network.

As describes above, the second embodiment can transmit the information contained in the first beacon and the second beacon of the first embodiment by one beacon. Consequently, in addition to an effect similar to that of the embodiment, a message number of the beacon can be reduced. Furthermore, although the beacon of the present embodiment is larger in message size than the case in which the first beacon and the second beacon are used, when error correction is performed, the effect of the error correction is relatively larger on the other hand.

As described above, the first and second embodiments use both two kinds of beacons or beacon payloads for which different security levels are used for the node already connected to the object network and the node unconnected thereto or encrypted with different cryptographic keys. With this configuration, the connection authentication for the unconnected node can be performed without requiring the provisioning network while providing the safety of communication for the already-connected node on the object network.

Figure 20:
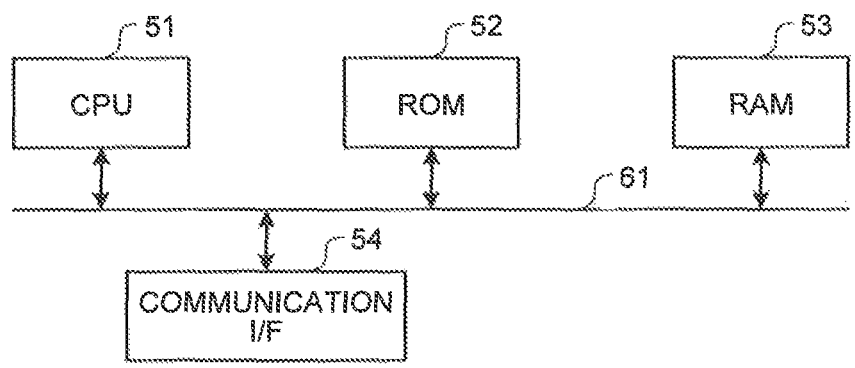
FIG. 20 is a hardware configuration diagram of a communication apparatus according to the first or second embodiment.

Next, the following describes a hardware configuration of the communication apparatus according to the first or second embodiment with reference to FIG. 20. FIG. 20 is an explanatory diagram of a hardware configuration of the communication apparatus according to the first or second embodiment.

The communication apparatus according to the first or second embodiment includes a control apparatus such as a CPU 51, storage apparatuses such as a read only memory (ROM) 52 and a RAM 53, a communication I/F 54 that connects to a network to perform communication, and a bus 61 connecting the respective parts with each other.

A communication program executed by the communication apparatus according to the first or second embodiment is embedded and provided in the ROM 52, for example.

The communication program executed by the communication apparatus according to the first or second embodiment may be recorded and provided in a computer-readable recording medium such as a compact disc read only memory (CD-ROM), a flexible disk (FD), a compact disc recordable (CD-R), and a digital versatile disc (DVD), as an installable or executable file.

The communication program executed by the communication apparatus according to the first or second embodiment may be stored in a computer connected to a network such as the Internet and provided by being downloaded via the network. The communication program executed by the communication apparatus according to the first or second embodiment may be provided or distributed via a network such as the Internet.

The communication program executed by the communication apparatus according to the first or second embodiment can cause a computer to function as the respective parts (the receiver, the first beacon processor, the second beacon processor, the authentication processor, and the like) of the communication apparatus. This computer can be implemented by causing the CPU 51 to read the communication program out of the computer-readable storage medium onto a main memory.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication apparatus comprising:
   a receiver configured to receive a first beacon transmitted over a wireless network while being encrypted with a first common key and a second beacon transmitted over the wireless network while not being encrypted with the first common key;
   a first beacon processor configured to access the wireless network using information obtained from decrypting the first beacon using the first common key when the first common key is provided;
   a second beacon processor configured to access the wireless network using information contained in the second beacon when the first common key is not provided; and an authentication processor configured to perform connection authentication to the wireless network using information contained in the second beacon and acquire the first common key, wherein the first beacon and the second beacon are included in a plurality of beacons periodically transmitted, and a mixed ratio between the first beacon and the second beacon in the plurality of beacons is designated, wherein the mixed ratio is changed such that the larger the number of apparatuses connected to the wireless network, the larger the number of the first beacon included in the plurality of beacons.

2. The communication apparatus according to claim 1, wherein the second beacon is transmitted over the wireless network while not encrypted.

3. The communication apparatus according to claim 1, wherein the second beacon is protected with a second common key differing from the first common key, the protection with the second common key including at least one of encryption with the second common key and addition of message authentication information being calculated using the second common key.

4. The communication apparatus according to claim 1, wherein the second beacon is protected with a public key or a secret key of public key cryptography, the protection with the public key or secret key including at least one of encryption with the public key or secret key and addition of message authentication information being calculated using the public key or secret key.

5. The communication apparatus according to claim 1, wherein the wireless network is a wireless network compliant with IEEE 802.15.4e-2012 Time-Slotted Channel Hopping (TSCH) Media Access Control (MAC), and the authentication processor performs connection authentication using a link that is a Shared Tx link and an Rx link of IEEE 802.15.4e-2012 TSCH MAC.

6. The communication apparatus according to claim 1, wherein the mixed ratio is changed in accordance with the number of apparatuses connected to the wireless network.

7. The communication apparatus according to claim 1, wherein the second beacon is transmitted in response to a transmission request of the second beacon.

8. The communication apparatus according to claim 1, wherein the second beacon does not contain information required only for an apparatus for which connection to the wireless network has been authenticated.

9. A computer program product comprising a non-transitory computer-readable medium including programmed instructions that cause a computer to function as:

a receiver configured to receive a first beacon transmitted over a wireless network while being encrypted with a first common key and a second beacon transmitted over the wireless network while not being encrypted with the first common key;

a first beacon processor configured to access the wireless network using information obtained from decrypting the first beacon using the first common key when the first common key is provided;

a second beacon processor configured to access the wireless network using information contained in the second beacon when the first common key is not provided; and an authentication processor configured to perform connection authentication to the wireless network using information contained in the second beacon and acquire the first common key, wherein the first beacon and the second beacon are included in a plurality of beacons periodically transmitted, and a mixed ratio between the first beacon and the second beacon in the plurality of beacons is designated, wherein the mixed ratio is changed such that the larger the number of apparatuses connected to the wireless network, the larger the number of the first beacon included in the plurality of beacons.

10. A method of communication comprising:

receiving a first beacon transmitted over a wireless network while being encrypted with a first common key and a second beacon transmitted over the wireless network while not being encrypted with the first common key;

accessing the wireless network using information obtained from decrypting the first beacon using the first common key when the first common key is provided;

accessing the wireless network using information contained in the second beacon when the first common key is not provided; and performing connection authentication to the wireless network using information contained in the second beacon and acquiring the first common key, wherein the first beacon and the second beacon are included in a plurality of beacons periodically transmitted, and a mixed ratio between the first beacon and the second beacon in the plurality of beacons is designated, wherein the mixed ratio is changed such that the larger the number of apparatuses connected to the wireless network, the larger the number of the first beacon included in the plurality of beacons.

\* \* \* \* \*